United States Patent [19]

Dahlin et al.

[11] Patent Number: 5,142,539

[45] Date of Patent: Aug. 25, 1992

[54] METHOD OF PROCESSING A RADIO SIGNAL MESSAGE

[75] Inventors: Jan E. Å. Dahlin, Järfälla; Alex K. Raith, Kista; Paul W. Dent, Stehag, all of Sweden

[73] Assignee: Telefonaktiebolaget L M Ericsson, Stockholm, Sweden

[21] Appl. No.: 489,008

[22] Filed: Mar. 6, 1990

[51] Int. Cl.⁵ .............................................. G06F 11/10
[52] U.S. Cl. ................................................ 371/37.1
[58] Field of Search ................ 371/37.1, 38.1, 39.1, 371/53, 54, 49.1, 51.1

[56] References Cited

U.S. PATENT DOCUMENTS

| | | | |
|---|---|---|---|
| 3,231,858 | 1/1966 | Tuomenoksa | 371/51.1 |
| 3,789,204 | 1/1974 | Barlow | 371/51.1 |
| 3,914,741 | 10/1975 | Bonser | 371/68.1 X |
| 4,471,486 | 9/1984 | Sibley | 371/53 |
| 4,617,662 | 10/1986 | Auer | 371/53 X |
| 4,618,955 | 10/1986 | Sharpe | 371/38.1 |
| 4,723,244 | 2/1988 | Iacoponi | 371/37.1 |
| 4,910,736 | 3/1990 | Tanaka | 371/37.7 |
| 5,003,539 | 3/1991 | Takemoto | 371/37.1 |

OTHER PUBLICATIONS

*Signaling Formats on the Digital Voice Channel,* TIA Tech. Subcommittee, Sep. 1989, pp. 1–7.

*Primary Examiner*—Robert W. Beausoliel
*Attorney, Agent, or Firm*—Burns, Doane, Swecker & Mathis

[57] ABSTRACT

A method in a mobile radiotelephone system in which an address is added to a symbol message in a control channel in order to exclude interfering connections operating on the same radio frequency as the actual connection between a base station and a mobile station. According to the proposed method, the address (A1) to the intended receiver is added to the message (M) and an error check word (E) is calculated based on both the address (A1) and the message (M). Before transmitting to the receiver, the added address is removed and the transmitted control signal includes only the symbol message (M) and the error check code (E). In the receiver, the specific address for the receiver is added to the received control signal and the same calculation is carried out as in the transmitter in order to get an accept/reject signal.

3 Claims, 3 Drawing Sheets

METHOD OF PROCESSING A RADIO SIGNAL MESSAGE

FIELD OF THE INVENTION

The present invention relates to a method of processing a radio signal message in a radio transmitter before transmitting the message to a radio receiver. More specifically, the present method relates to processing a radio signal message in a cellular mobile telephone system where the signal is used for specific purposes as, for example, measurement values, hand-off commands etc. and which is intended to be protected from co-channel disturbances.

DESCRIPTION OF PRIOR ART

Radio messages transmitted in the form of a number of binary bits, Morse code or higher order symbols such as quaternary, 256-QAM, MFSK, piccolo-coded Murray code or suchlike may often be unintentionally but correctly received by other than the intended recipient, especially where a radio network includes a multiplicity of similar stations or in radio networks characterised by multiple use of the same frequencies in more or less neighbouring geographical areas. Typical of such systems is a radio telephone network, in which the required capacity to serve a large number of subscribers, measured in terms of the number of simultaneous conversations per square kilometer per megahertz, can only be achieved by frequent re-use of the same set of frequencies.

To prevent a message destined for a particular station accidently being acted upon by a different but physically identical station, a solution can be to include an address code, name or number of a specific station in the message. The disadvantage of this is that it uses up scarce communications capacity to transmit such addresses, particularly when the messages are short.

The invention outlined below concerns a method to minimise the risks of such occurrences without specifically including address bits in the transmitted message, thus avoiding waste of capacity.

The known methods for avoiding messages intended for a specific radio station accidently being acted upon by another similar station are briefly enumerated here in order to distiguish them from the pressent invention.

Addressing

As mentioned above, a well-used method involves including specific address bits or some data to identify the intended recipient in the message. The message would only then be mistakenly acted upon by a non-intended recipient if transmission errors occurred in the address code.

Ways to protect against transmission errors, either by error corrective coding, which involves calculating and transmitting extra data symbols, or by adding an error detecting code that at least covers the address bits that one wishes to protect, are well known. These methods involve therefore not only the transmission of an address code, but also transmission of error control bits.

Enchiphering

Enciphering messages with a secret code or key specific to a particular station is a known way of preventing a message intended for one station being understood by another. Use of enciphering with station-specific codes or keys as a means of message addressing would in itself not be sufficient, as in most such applications difficulties would arise unless stations also had a means to test whether a message had been correctly deciphered or not, that would avoid them attempting to act upon a completely erroneously decoded message. Therefore enciphering must be complemented by the inclusion of address bits, error detection bits, or other form of redundancy in the message.

SUMMARY OF THE INVENTION

An object of the present invention is to provide a message transmitting method to ensure that the message is received by the correct receiver in spite of other disturbing radio transmitters in a mobile radio telephone system.

Another object of the invention is to provide a message transmitting method for a control message between two stations in a mobile telephone system network in such a way as to permit simultaneous verification that no errors have occurred in transmission and that the receiving station is the correct one without requiring additional address bits in the messsage to identify the intended station.

Accordingly, the method of the present invention does not transmit the address part of the message to the intended radio station but only the message itself together with an error detection code which has been calculated on the basis of both the message and the address of the intended receiver. Since the receiver knows his own address, it can check the postulate that the transmitted error code was generated with the same address and if the postulate is verified, the message is accepted.

The method is characterized as it appears from the appended claims.

BRIEF DESCRIPTION OF THE DRAWINGS

The present method will be closer described with reference to the accompanying drawings in which.

DESCRIPTION OF PREFERRED EMBODIMENTS

Figure 1:
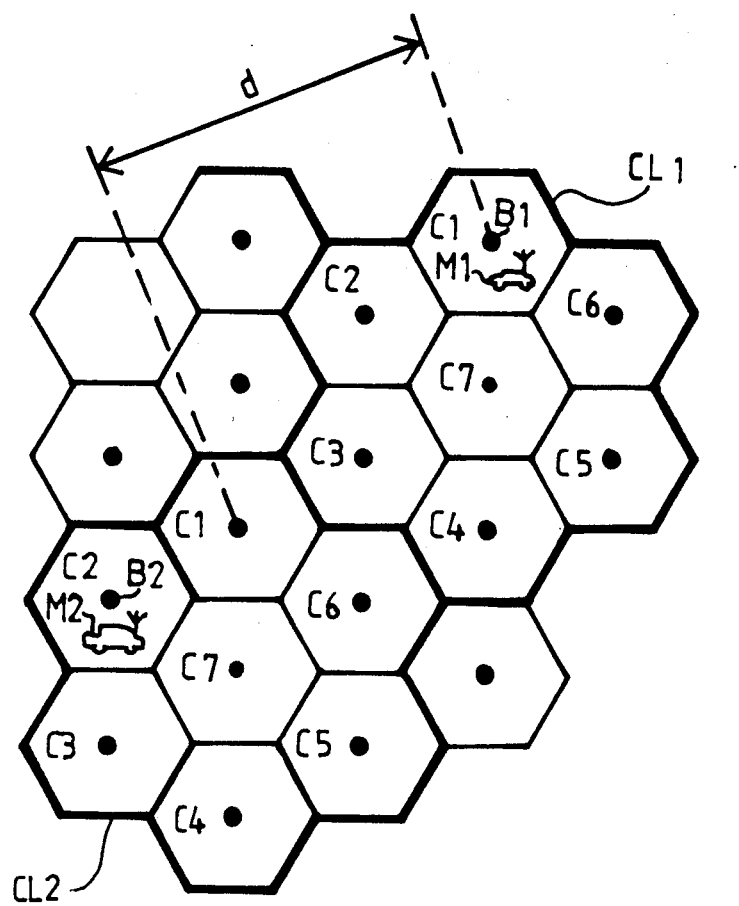
FIG. 1 shows a part of a geographical area covered by a cellular mobile telephone network.

FIG. 1 shows a geographical mapping of a number of cells in a mobile radio system in which the present method is applied. The cells are grouped in "clusters" so that every cluster includes a determined number of cells. In FIG. 1 two clusters CL1 and CL2 are shown, each consisting of seven cells C1-C7.

Cluster CL1 has the same set of carrier frequency $f_1$, ..., $f_n$ as the cluster CL2 and all other clusters in the system, i.e. the same set of frequencies are reused from one cluster to another, so called "reuse partitioning".

Cells C1-C6 have mutually different subsets of carrier frequencies so that calls within one cell C1 do not interfere with calls in a neighbouring cell C2. Cell C1 in cluster CL1 has the same frequency subset as cell C1 in cluster CL2 but due to the long distance d between the base stations in cells C1 and C2 the calls do not interfere with one another.

When a call is to be established between two mobile subscribers M1, M2, a channel (i.e. a certain carrier frequency) is allocated the established call after the paging and access procedures. The call and the speech will be progressed on a certain connection between the two mobile subscribers.

Suppose that mobile M1 in cell C1, cluster CL1 is the calling subscriber and that mobile M2 in cell C2, cluster CL2 is the called subscriber. Then the established connection between the mobile subscribers M1 and M2 has a certain address which depends on in which cluster the called subscriber is situated. Each cluster in the system has a specific connection address. If cluster CL1 has the address A1 and cluster CL2 has the address A2, then the established connection between mobiles M1, M2 has the address A2.

This connection address is known to mobile M2 as long as he is situated in cluster CL2. It is also known by mobile M1 because mobile M2 was located to cluster CL2 before the call was established and the cluster address A2 for mobile M2 was informed to mobile M1. Thus the address A2 is known both in mobile M1 and mobile M2 during the connection.

Figure 2:
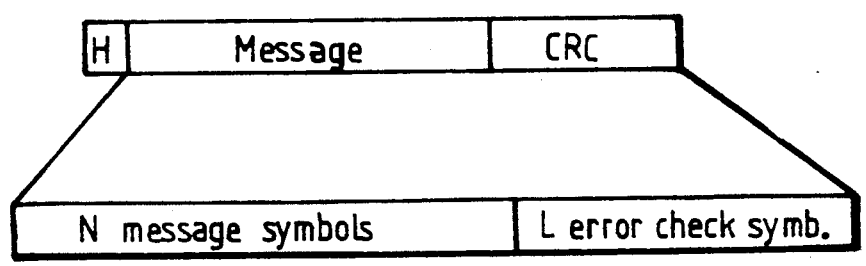
FIG. 2 shows a control word format for a control channel in a cellular network.

During the connection, control signals for various purposes are transmitted and received by the mobiles M1, M2 from the belonging base stations B1, CL1 and B1, CL2. Such control signals can transmit measuring information, hand-off requests and the connection address mentioned above. The control signals are transmitted on a specific control channel which can be interleaved the normal time slots in a TDMA-system. FIG. 2 illustrates a message word format for such a control channel.

It contains a header H to indicate the beginning or continuation of a control word, a message M containing N message symbols and an error correction word E including a cyclic redundancy check part CRC. Eventually the control word can contain a tail needed for a convolutional code and a parity.

Figure 3:
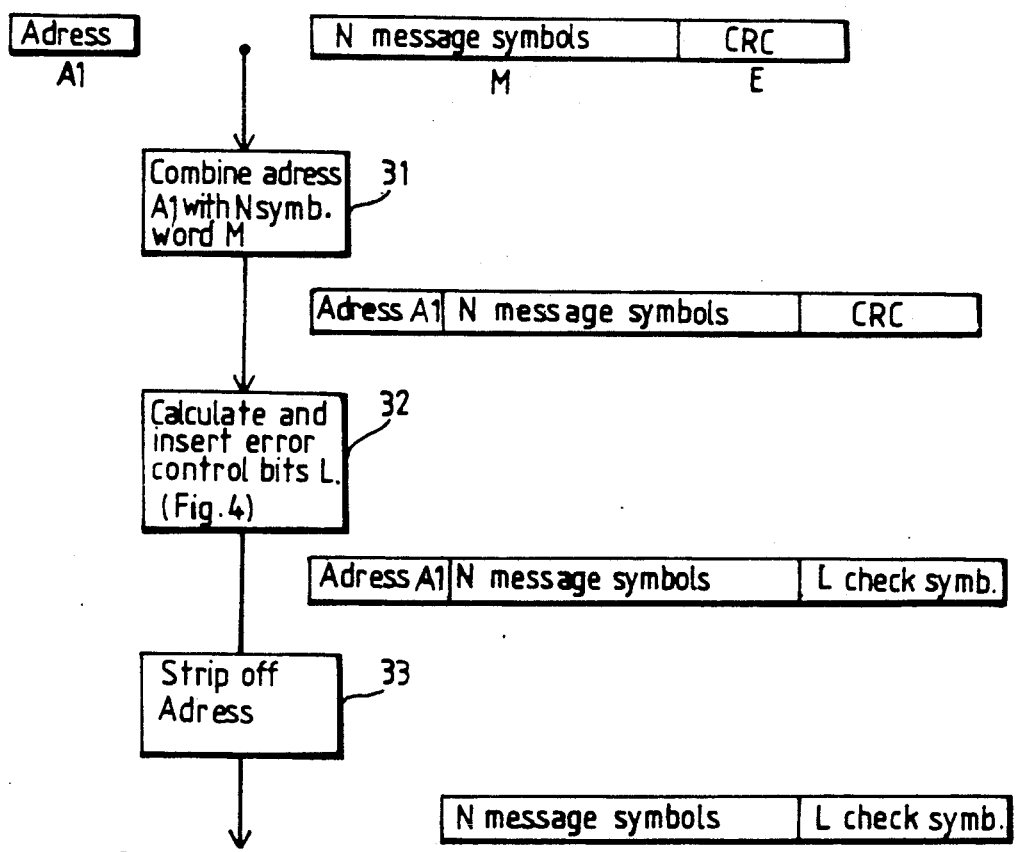
FIG. 3 shows a flow chart illustrating the present method for a message according to FIG. 2.

FIG. 3 shows a flow chart over the processing of a message M and the error correcting word E before transmission from a base station (transmitter) to a mobile station (receiver) according to the present method.

In a first step 31, the address bits A1 are added to the message word M. Address A1 is specific for the cluster, for example, cluster CL1 in which mobile M1 is situated. After step 31, the control word contains the address A1, the message word M and the error check word E.

In a second step 32 the bits in the error check word E are calculated from the expanded message M and address A1 by some coding process which will be closer described in connection with FIG. 4. Thus, after step 32 the control word is obtained which includes address A1, message M and an error check word E, but the check bits in error word E have been calculated in dependence on both the address A1 and the message M. This control word is processed in step 33 where the address A1 is removed, leaving a control word with only the message M and the L-bit error check word E.

Before step 31 the number of symbols in the control word was N+L and after the step 33 the number of symbols is still N+L although the address of the intended receiver is inherent in the error check word E (L symbols). This is possible because each receiver knows precisely what the address symbols are in the case a message is destined for it, and knows where to re-insert the address symbols before carrying out the error check process.

In this way it is possible simultaneously to verify that a message is intended to be acted upon by a specific station and that it does not contain errors. A non-intended receiver will reinsert different address symbols than those used to compute the error check code, and the differences in the address will have precisely the same effect on the error check process as errors in transmission, causing the message to be rejected.

Figure 4:
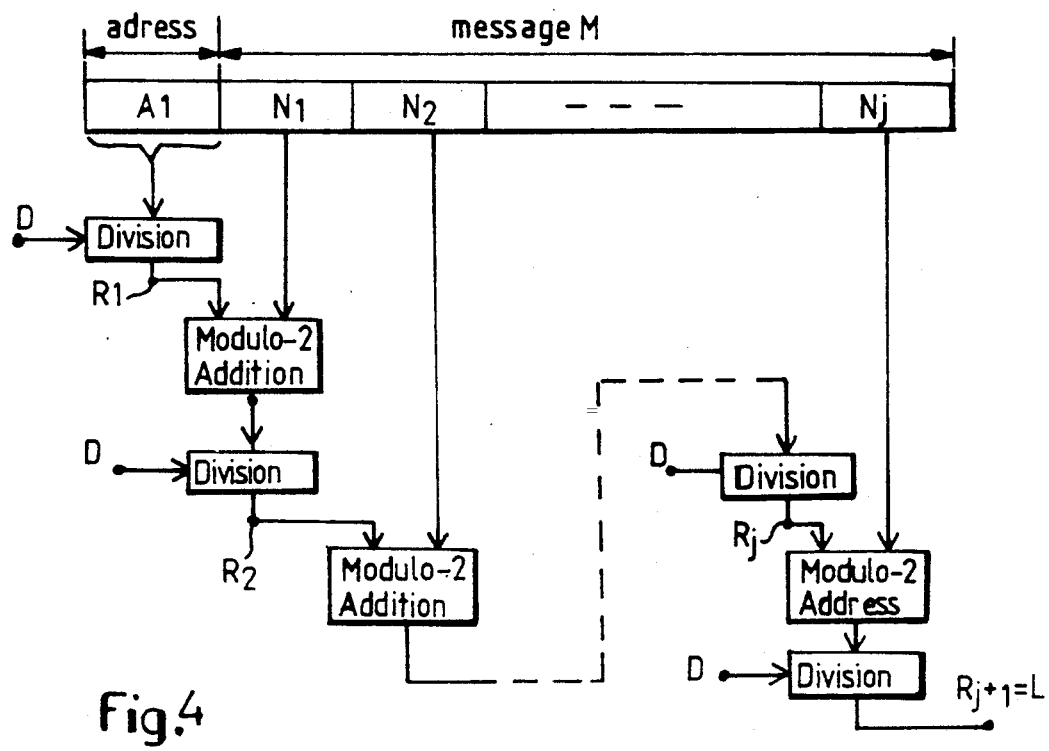
FIG. 4 shows a flow chart to generate the error check symbols included in the control word according to FIG. 2.

A typical method of calculating the error check symbols in the error check word E is shown in FIG. 4.

Message M contains N message symbols which consist of binary digits 0 or 1. The address A1 of the intended receiver has been added to the message symbols and these have been split up into the symbol groups N1, N2, ..., $N_j$. The number of symbols in each group including the address A1 is equal, for example, 8 bits.

The first group, i.e. the address A1 is divided by a fixed binary divisor D with a certain number of bits, for example, 11 bits. This division gives a remainder R1 which has been truncated to 8 bits. The division process used is typically Galois or polynomial division rather than normal arithmetic.

After this, the remainder R1 is modulo-2 added to the next group, i.e, N1, and the next division is carried out with the same fixed divisor D as in the previous step, giving a remainder $R_2$ which is modulo-2 added to group N2.

The last division gives a remainder $R_j$ which is modulo-2 added to the last group $N_j$. When all the symbol groups A1, N1, ..., $N_j$ have been treated, the final remainder $R_{j+1}$ is the L bit error control code or "CRC" check.

At the receiver, it can be shown that exactly the same division process performed using the same divisor, but on the N+L bit message, will result in a zero remainder if no errors have occurred in transmission. The receiver uses this fact to screen received messages for errors.

If the message does not contain station-specific address or identification bits, and the method of computing the error control bits is the same for all stations, then there is nothing to hinder any station from acting on all such messages.

The present method begins by including a connection-specific address or identification symbols or bits in the process for computation of the error control symbols. It is not material to the invention precisely how the address symbols are included. For example, FIG. 3 shows the address symbols included before the first message data symbol, but they could equally well have been inserted more or less randomly into the body of the message. The error control symbols would then be computed from this expanded message+address by some known coding means, the error control symbols appended to or inserted into the message, and the specific address symbols removed before transmission, leaving the number of symbols to be transmitted unchanged at N+L. This is possible because each receiver knows precisely what the address symbols are in the case a message is destined for it, and where to re-insert them before carrying out the error check process.

In this way it is possible simultaneously to verify that a message is intended to be acted upon by a specific station and that it does not contain errors. A non-intended receiver will reinsert different address symbols than those used to compute the error check code, and the differences in the address will have precisely the same effect on the error check process as errors in transmission, causing the message to be rejected.

Figure 5:
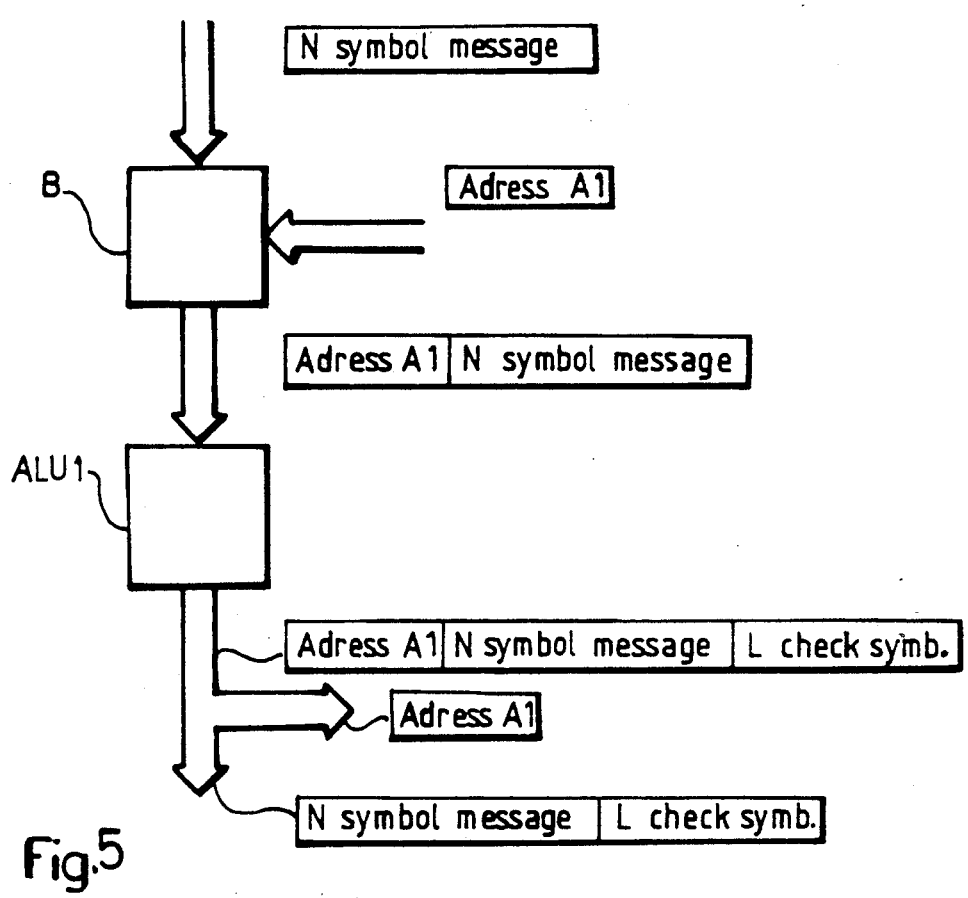
FIG. 5 shows a block diagram of a hardware implementation of the present method in a transmitter.

FIG. 5 shows a simplified block diagram of the apparatus in a transmitter to perform the proposed method. The transmitter can be a base station transmitter and the address information is to be transmitted after that a call has been established. For example, a call has been established between mobile M1 and mobile M2, and the base station B2 in cluster CL2 is to transmit the address A2 across a control channel in direction towards mobile M2 as described above (FIGS. 1–2). Other mobiles in cluster CL2 could respond to the address A2, but only mobile M2 will accept the message on the specific radio channel already assigned to M2.

The N symbol message which is to be transmitted to mobile M2 is input to a buffer memory BM in which the specific address A for the connection is added to the N symbol message. This address is known from the established call. The buffer memory BM can, for example, consist of a clocked shift register having a number of stages equal to the number bits of the N symbol message and the address A.

The output of the buffer memory BM is supplied to an arithmetic-logic unit ALU1. This unit is an ordinary arithmetic-logic unit of known design but is programmed to carry out a calculation of the error check code in accordance with the flow chart illustrated in FIG. 4. Across its output therefore a composite word is obtained which includes the address A, the N symbol message and the error check code. From this word the address part A can be easily separated because the number of address bits is known. If the address bits are inserted or otherwise combined with the N symbols in the message this is known to the transmitter an the address bits can be scanned and extracted from the composite word. Thus, the N symbol message together with the L check symbols are delivered to the transmitting circuits for radio transmission to the receiver (mobile M2).

Figure 6:
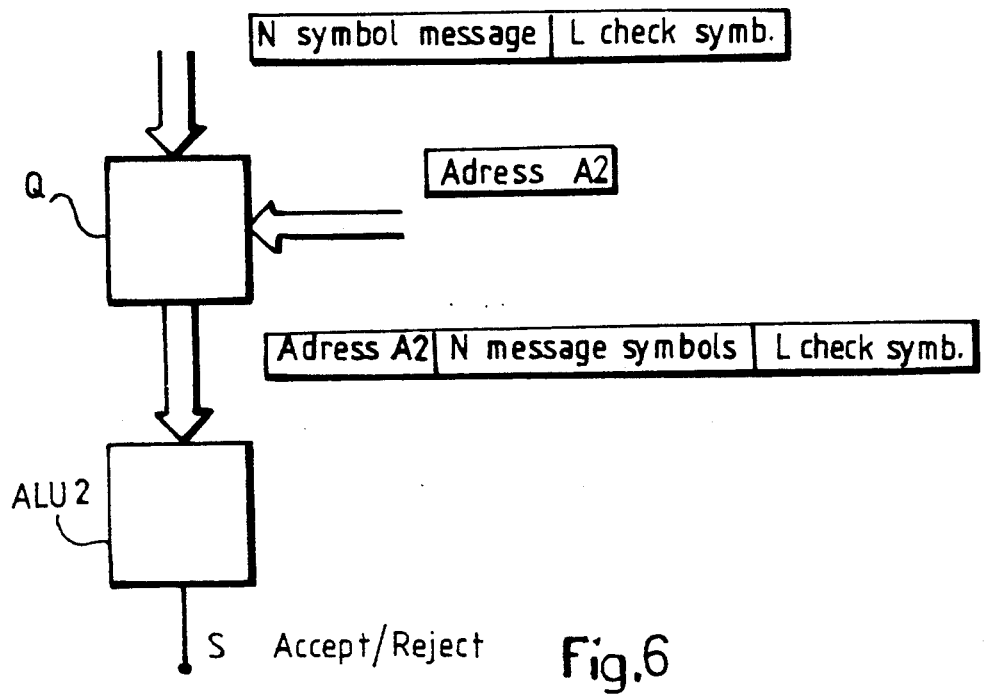
FIG. 6 shows a block diagram of a corresponding hardware implementation in a receiver.

FIG. 6 shows a simplified block diagram of the receiver part where an incoming N symbol message together with L error check symbols. Address word A2 which should be equal to address word A1 from the transmitter is supplied to a unit Q. This unit combines the address A2 with the received message and error check word in the same manner as the addres A1 was combined with the N message word in the transmitter. For example, the address word A1 may simply have been concatenated with the N message symbols. The composite word obtained from unit Q is supplied to the arithmetic-logic unit ALU2 which performs the error check in the same manner as was made in the arithmetic-logic unit ALU1 in the transmitter although in the inverse manner. If no transmission errors appear the result will be a zero remainder in case the same division process is used in the receiver as was carried out in the transmitter. This zero remainder is an accept signal for the receiver. If transmission errors appear or if the received message is not the correct one (an interfering transmitter) a remainder different from zero is obtained which is a reject signal.

What is claimed is:

1. A method of processing a radio signal message (M) containing N message symbols in a transmitting station for transmission to an intended receiving station among a plurality of receiving stations including the following steps:

selecting an address word (A1) containing A symbols to indicate the intended receiving station, combining the address word (A1) with the signal message (M) thereby obtaining a first addressed message, calculating an L symbol check word (E) by means of a determined operation and combining the check word (E) with the first addressed message thereby obtaining a first control word having $A+N+L$ symbols, said check word symbols being dependent both on the address word symbols and the signal message symbols, removing from the first control word the A address symbols, forming a shortened control word having $N+L$ symbols for transmission of the shortened control word to the intended receiving station.

2. A method of processing a radio signal message containing N received message symbols and L received error checking symbols in a receiving station having an address (A2) containing A symbols, said L received error checking symbols having been calculated in accordance with the method as claimed in claim 1 in order to verify that the N received message symbols are intended for the receiving station and that the message contains no errors, including the following steps:

combining the signal message with the receiving station's address (A2) and forming a combined message having $N+L+A$ symbols, calculating L calculated error checking symbols from the N received message symbols and the receiving station's address (A2) by means of an operation which is mathematically equivalent, but inverse to, the operation carried out in the transmitting station, comparing the L calculated error checking symbols with the L received error checking symbols, and extracting the N received message symbols if the L calculated error checking symbols are in a determined relationship with the L received error checking symbols, else rejecting said N received message symbols.

3. A method of processing a radio signal message (M) containing N message symbols including the following steps:

selecting an address word (A1) containing A symbols to indicate an intended receiving station, combining the address word (A1) with the signal message (M) thereby obtaining a first addressed message, calculating an L symbol check word (E) by means of a determined operation and combining the check word (E) with the first addressed message thereby obtaining a first control word having $A+N+L$ symbols, said check word symbols being dependent both on the address word symbols and the signal message symbols, removing from the first control word the A address symbols, forming a shortened control word having N received message symbols and L received error checking symbols and transmitting the shortened control word to a receiving station having an address (A2) containing A symbols, receiving the shortened control word at the receiving station having the address (A2), combining the shortened control word with the receiving station's address (A2) and forming a combined message having N+L+A symbols, calculating L calculated error checking symbols from the N received message symbols and the receiving station's address (A2) by means of an operation which is mathematically equivalent, but inverse to, the operation carried out in the transmitting station, comparing the L calculated error checking symbols with the L received error checking symbols, and extracting the N received message symbols if the L calculated error checking symbols are in a determined relationship with the L received error checking symbols, else rejecting the N received message symbols.

* * * * *